United States Patent
Wang (10) Patent No.: US 11,839,957 B2
(45) Date of Patent: Dec. 12, 2023

(54) INTELLIGENT ELECTRIC TOOL AND CONTROL METHOD THEREOF

(71) Applicant: Nanjing Chervon Industry Co., Ltd., Nanjing (CN)

(72) Inventor: Pengchen Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 380 days.

(21) Appl. No.: 17/215,572

(22) Filed: Mar. 29, 2021

(65) Prior Publication Data

US 2021/0331298 A1 Oct. 28, 2021

(30) Foreign Application Priority Data

Apr. 28, 2020 (CN) .......................... 202010350902.3

(51) Int. Cl.
 *B25B 21/00* (2006.01)
 *H02P 3/06* (2006.01)
(52) U.S. Cl.
 CPC .............. *B25B 21/002* (2013.01); *H02P 3/06* (2013.01)
(58) Field of Classification Search
 CPC .................................................. B25B 21/002
 See application file for complete search history.

(56) References Cited

U.S. PATENT DOCUMENTS

| 7,552,781 | B2 |   | 6/2009 | Zhang et al. |            |
|-----------|----|---|--------|--------------|------------|
| 10,011,006| B2 | * | 7/2018 | Sergyeyenko  | B25B 21/008|
| 2011/0000688 | A1 | * | 1/2011 | Iwata   | H02P 29/032 700/170 |
| 2013/0269961 | A1 | * | 10/2013 | Lim    | B25B 23/147 173/1 |
| 2013/0331994 | A1 | * | 12/2013 | Ng     | B25B 23/147 700/275 |
| 2014/0367134 | A1 | * | 12/2014 | Phillips | B25B 21/00 173/176 |
| 2018/0248507 | A1 | * | 8/2018 | Vanko    | H02P 29/50 |
| 2019/0321949 | A1 | * | 10/2019 | Miyazaki | B23P 19/065 |

OTHER PUBLICATIONS

EPO, extended European search report issued on European publication No. 3909720, dated Oct. 19, 2021, 8 pages.

* cited by examiner

*Primary Examiner* — Nathaniel C Chukwurah
(74) *Attorney, Agent, or Firm* — Greenberg Traurig, LLP (57) ABSTRACT

An intelligent electric tool includes an output shaft, a motor, a transmission assembly, an adjustment assembly, a detection unit, and a controller. The output shaft outputs torsion. The motor drives the output shaft to rotate. The transmission assembly connects the motor to the output shaft. The adjustment assembly adjusts an operating mode of the intelligent electric tool, where the operating mode includes at least a metal mode. The detection unit detects a current value of the intelligent electric tool in operation. The controller determines a first detection value and a second detection value according to the current value of the intelligent electric tool in operation and control, according to the first detection value and/or the second detection value, the motor to stop rotating to control the intelligent electric tool to stop.

10 Claims, 4 Drawing Sheets

---

Calculate, according to a current value at each moment of an intelligent electric tool sampled within a second preset time window, a difference between a current value at a current moment and a current value at a previous moment adjacent to the current moment ⟋410

Divide the difference between the current value at the current moment and the current value at the previous moment by the current value at the previous moment to obtain a current trend value at the current moment ⟋420

Calculate, according to a maximum current value and a minimum current value of current values of an intelligent electric tool sampled within a first preset time window, a difference between the maximum current value and the minimum current value ⟵ 310

Multiply the difference between the maximum current value and the minimum current value by a preset number to obtain a multiple of the difference and divide the multiple of the difference by the minimum current value to obtain a current change rate ⟵ 320

INTELLIGENT ELECTRIC TOOL AND CONTROL METHOD THEREOF

RELATED APPLICATION INFORMATION

This application claims the benefit of CN 202010350902.3, filed on Apr. 28, 2020, the disclosure of which is incorporated herein by reference in its entirety.

BACKGROUND

With the development of intelligent control technologies, the intelligent control technologies of electric tools have increasingly wide applications. For example, an electric drill driver utilizes a controller to drive a motor to implement the assembly, the disassembly, or the like of fasteners.

However, during an operation of the electric drill driver, for example, when the electric drill driver drives a metal screw into a multi-layer steel plate or a multi-layer wood board, if the electric drill driver cannot be stopped in time when the screw is driven to the bottom, the electric drill driver may slip so that the screw is loosened and thus the fastening of the steel plate or the wood board may be affected. In the related art, a predetermined position threshold is generally set according to an operating condition, and whether a trigger position exceeds the predetermined position threshold is determined to determine whether to stop the electric drill driver. However, an automatic stop under various operating conditions cannot be achieved by this method and thus operating efficiency is reduced.

SUMMARY

The present disclosure provides an intelligent electric tool and a control method thereof for controlling, according to a first detection value and/or a second detection value of the intelligent electric tool, a motor to stop rotating to control the intelligent electric tool to stop, which can adapt to various different operating conditions and improving operating efficiency.

By way non-limiting example, the present disclosure describes an intelligent electric tool including an output shaft, a motor, a housing, a transmission assembly, an adjustment assembly, a detection unit, and a controller.

The output shaft is configured to output torsion.

The motor is configured to drive the output shaft to rotate.

The housing is used for accommodating the motor.

The transmission assembly is configured to connect the motor to the output shaft.

The adjustment assembly is configured to adjust an operating mode of the intelligent electric tool, where the operating mode includes at least a metal mode.

The detection unit is configured to detect a current value of the intelligent electric tool in operation.

The controller is configured to determine a first detection value and a second detection value according to the current value of the intelligent electric tool in operation and control, according to the first detection value and/or the second detection value, the motor to stop rotating to control the intelligent electric tool to stop. In a second aspect, examples of the present disclosure further provide a method for controlling an intelligent electric tool. The method includes steps described below. A current value of the intelligent electric tool in operation is acquired.

A first detection value and a second detection value are determined according to the current value of the intelligent electric tool in operation.

In response to the first detection value and/or the second detection value satisfying a preset condition, the intelligent electric tool triggers a stop. In the technical solutions provided by the examples of the present disclosure, the intelligent electric tool for driving a fastener into a workpiece is provided. The intelligent electric tool includes the output shaft, the motor, the housing, the transmission assembly, the adjustment assembly, the detection unit, and the controller. The output shaft is configured to output the torsion. The motor is configured to drive the output shaft to rotate. The housing is used for accommodating the motor. The transmission assembly is configured to connect the motor to the output shaft. The adjustment assembly is configured to adjust the operating mode of the intelligent electric tool, where the operating mode includes at least the metal mode. The detection unit is configured to detect the current value of the intelligent electric tool in operation. The controller is configured to determine the first detection value and the second detection value according to the current value of the intelligent electric tool in operation and control, according to the first detection value and/or the second detection value, the motor to stop rotating to control the intelligent electric tool to stop. In this manner, the problem of a failure to implement an automatic stop under various operating conditions and low operating efficiency in the related art is solved, and the motor can be controlled to stop rotating according to the first detection value and/or the second detection value of the intelligent electric tool so that the intelligent electric tool is controlled to stop, which can adapt to various different operating conditions and improve the operating efficiency.

DETAILED DESCRIPTION

Hereinafter the present disclosure is described in more detail in conjunction with drawings and examples. It is to be understood that the examples set forth herein are merely intended to illustrate and not to limit the present disclosure.

Figure 1:
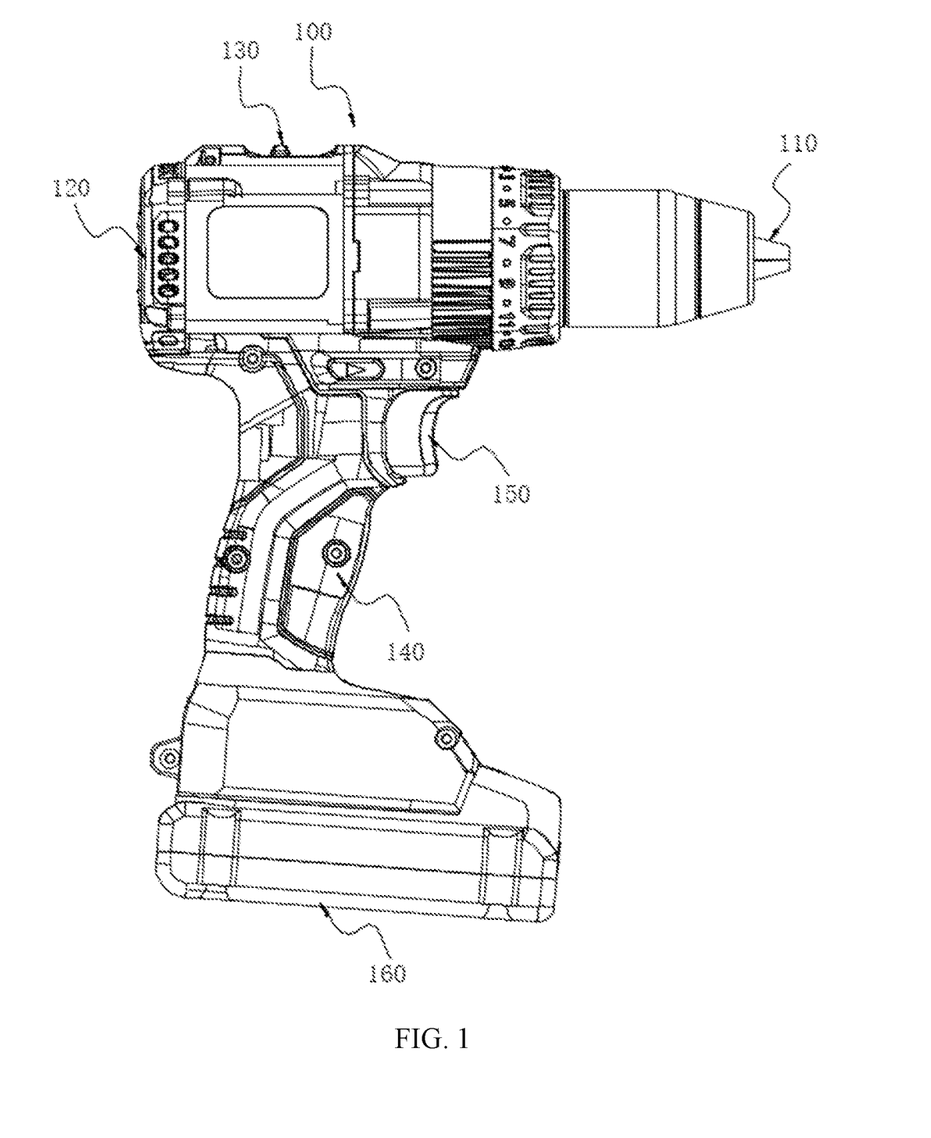
FIG. 1 is a structure view of an intelligent electric tool according to an example of the present disclosure.
Figure 2:
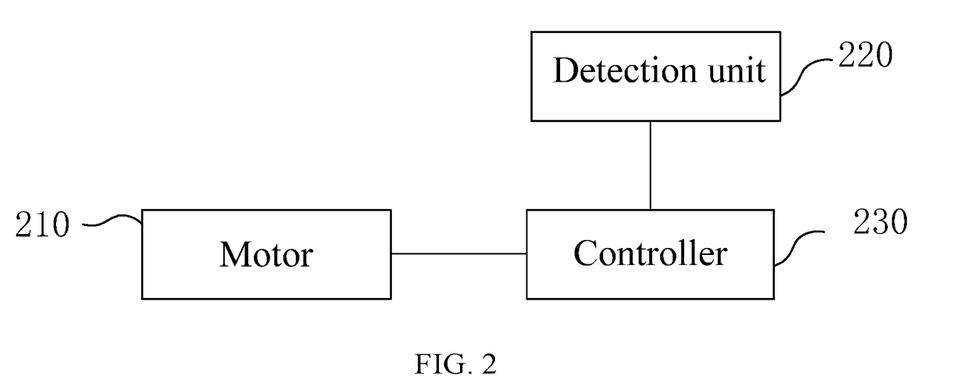
FIG. 2 is another structure view of an intelligent electric tool according to an example of the present disclosure.

FIG. 1 is a structure view of an intelligent electric tool according to an example of the present disclosure. FIG. 2 is another structure view of an intelligent electric tool according to an example of the present disclosure. The intelligent electric tool is configured to drive a fastener into a workpiece. Referring to FIG. 1 and FIG. 2, the intelligent electric tool 100 includes an output shaft 110, a motor 210, a housing 120, a transmission assembly, an adjustment assembly 130, a detection unit 220, and a controller 230. The output shaft 110 is configured to output torsion. The motor 210 is configured to drive the output shaft 110 to rotate. The housing 120 is used for accommodating the motor. The transmission assembly is configured to connect the motor to the output shaft.

The adjustment assembly 130 is configured to adjust an operating mode of the intelligent electric tool, where the operating mode includes at least a metal mode. The metal mode is applicable to an operating condition under which hard materials such as an aluminum plate or a thin steel plate need to be drilled and tightened. In addition, the operating mode of the intelligent electric tool may further include a wood mode, a drill mode, and a normal mode. The wood mode is applicable to an operating condition under which materials such as plastics or wood boards with soft woodiness are to be drilled and tightened. The drill mode is applicable to an operating condition under which wood boards, metal plates, or the like only need to be drilled. The normal mode is applicable to the conditions in the preceding various modes.

The detection unit 220 is configured to acquire a current value of the intelligent electric tool in operation.

The controller 230 is configured to determine a first detection value and a second detection value according to the current value of the intelligent electric tool in operation and control an operation of the intelligent electric tool. The controller controls the intelligent electric tool to operate at predetermined ever smaller speeds or stop when the fastener driven by the intelligent electric tool is in contact with a bottom.

The controller 230 is configured to control, according to the first detection value and/or the second detection value, the motor 210 to stop rotating to control the intelligent electric tool to stop.

It is to be noted that in the example of the present disclosure, the detection unit 220 and the controller 230 are disposed separately, and in other examples, the detection unit 220 and the controller 230 may also be integrated as a whole.

Referring to FIG. 1, the intelligent electric tool 100 includes the housing 120, the output shaft 110, a holding part 140, a speed regulation mechanism 150, a power supply device 160, the motor, and the controller.

The housing 120 is formed with the holding part 140 for a user to hold. Of course, the holding part 140 may be provided as an independent component. The housing 120 constitutes a main body of the intelligent electric tool 100 and is used for accommodating the motor, the controller, the transmission assembly, and other electronic components such as a circuit board. The output shaft 110 may be configured to mount a function part.

The function part is used for implementing a function of the intelligent electric tool 100 and driven by the motor to operate. Different intelligent electric tools have different function parts. For a screwdriver, the function part is a sleeve configured to fasten or remove a screw. The function part is operatively connected to the motor. Specifically, the function part is electrically connected to the motor via the output shaft 110 and the transmission assembly.

The speed regulation mechanism 150 is at least configured to set a target rotational speed of the motor, that is, the speed regulation mechanism 150 is configured to regulate a rotational speed of the motor. The speed regulation mechanism 150 may be, but is not limited to, a trigger, a knob, a sliding mechanism, or the like. In this example, the speed regulation mechanism 150 is configured as the sliding mechanism. Whether the intelligent electric tool 100 is currently in a set speed mode may be determined by acquiring an output signal of the speed regulation mechanism. For example, an output signal of a trigger switch is acquired so that whether the trigger switch is within a set range of pressing angles is determined, and thus whether the electric tool is in the set speed mode can be determined.

The power supply device 160 is configured to provide electrical energy for the intelligent electric tool 100. In this example, the intelligent electric tool 100 is powered by a battery pack. Optionally, the intelligent electric tool 100 further includes a battery pack jointing part for connecting the battery pack to the intelligent electric tool.

The motor and the controller of the intelligent electric tool 100 are disposed in the housing 120 (not shown in FIG. 1), and the motor is configured to drive a corresponding function part to operate in response to a control signal of the controller so that the intelligent electric tool 100 operates normally.

In the technical solutions provided by the example of the present disclosure, the intelligent electric tool for driving the fastener into the workpiece is provided. The intelligent electric tool includes the output shaft, the motor, the housing, the transmission assembly, the adjustment assembly, the detection unit, and the controller. The output shaft is configured to output the torsion. The motor is configured to drive the output shaft to rotate. The housing is used for accommodating the motor. The transmission assembly is configured to connect the motor to the output shaft. The adjustment assembly is configured to adjust the operating mode of the intelligent electric tool, where the operating mode includes at least the metal mode. The detection unit is configured to detect the current value of the intelligent electric tool in operation. The controller is configured to determine the first detection value and the second detection value according to the current value of the intelligent electric tool in operation and control, according to the first detection value and/or the second detection value, the motor to stop rotating to control the intelligent electric tool to stop. In this manner, the problem of a failure to implement an automatic stop under various operating conditions and low operating efficiency in the related art is solved, and the motor can be controlled to stop rotating according to the first detection value and/or the second detection value of the intelligent electric tool so that the intelligent electric tool is controlled to stop, which can adapt to various operating conditions and improve the operating efficiency.

The intelligent electric tool provided by the example of the present disclosure can execute a method for controlling the intelligent electric tool provided by any example of the present disclosure and has corresponding function modules for executing the method and beneficial effects.

In an example of the intelligent electric tool, the intelligent electric tool may be an electric drill driver including a motor, a controller, a drill for fastening a screw, and a detection unit. On the basis of the preceding examples, by using the electric drill driver as an example, a specific operating principle of the intelligent electric tool provided by the example of the present disclosure is described below. For example, in a process of tightening the screw with the electric drill driver, the detection unit detects a current value output by the motor of the electric drill driver in real time and feeds the current value detected in real time back to the controller in real time, the controller calculates a first detection value and a second detection value of a current at a corresponding moment in real time according to the current value received in real time, and then the controller compares the calculated first detection value and second detection value at the corresponding moment with a preset condition preset in software. If the first detection value and/or the second detection value satisfy the preset condition, that is, the screw is driven to the bottom by the electric drill driver, the controller controls the motor to stop rotating to control the electric drill driver to stop. It can be seen that the controller can determine whether the electric drill driver drives the screw to the bottom by determining whether the first detection value and/or the second detection value of the electric drill driver in operation satisfy the preset condition. When the first detection value and/or the second detection value of the electric drill driver in operation satisfy the preset condition, it indicates that the electric drill driver drives the screw to the bottom, and at this time, the controller controls the motor to stop rotating in time, thereby avoiding the case where the electric drill driver slips, the screw is loosened and fastening efficiency is affected since the electric drill driver drives the screw to the bottom. In addition, various different combinations of determination conditions of the first detection value and/or the second detection value can adapt to various different operating conditions, thereby improving the fastening efficiency of the electric drill driver.

Figure 3:
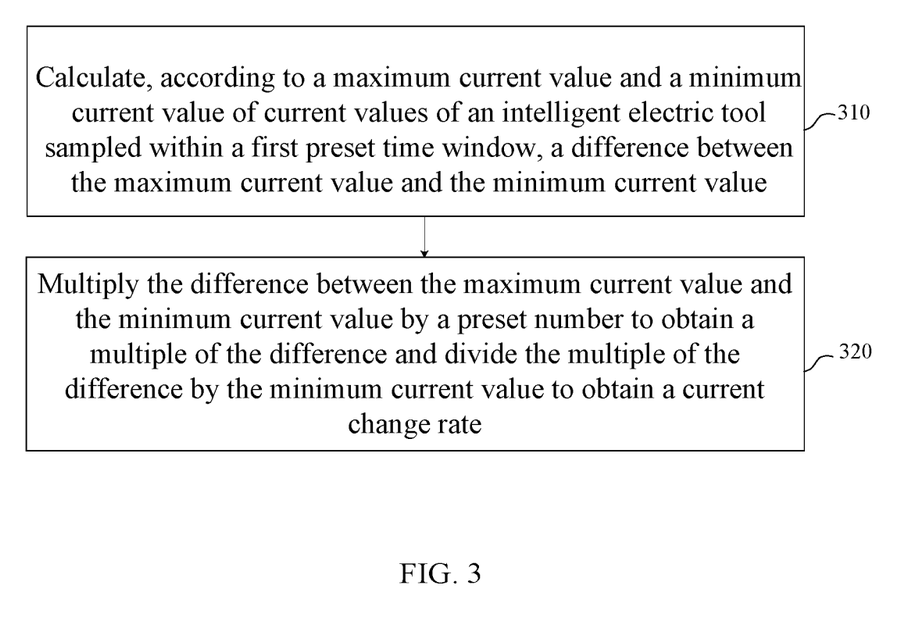
FIG. 3 is a flowchart of a method for calculating a first detection value of an intelligent electric tool according to an example of the present disclosure.

FIG. 3 is a flowchart of a method for calculating a first detection value of an intelligent electric tool according to an example of the present disclosure. Referring to FIG. 3, on the basis of the preceding technical solutions, the method for calculating the first detection value provided by the example of the present disclosure includes steps described below.

In step 310, a difference between a maximum current value and a minimum current value is calculated according to the maximum current value and the minimum current value of current values of the intelligent electric tool sampled within a first preset time window.

Specifically, the maximum current value and the minimum current value sampled within the first preset time window are found according to the current values of the intelligent electric tool sampled within the first preset time window, and the difference between the maximum current value and the minimum current value is calculated according to the sampled maximum current value and minimum current value. The first preset time window may be a fixed time interval such as 50 milliseconds, 100 milliseconds or 150 milliseconds or may also be multiple different fixed time intervals. It is to be noted that a specific value and a setting type of the first preset time window may be set according to specific operating conditions. Only an exemplary description is provided here, and the specific value of the first preset time window is not specifically limited herein.

In step 320, the difference between the maximum current value and the minimum current value is multiplied by a preset number to obtain a multiple of the difference, and the multiple of the difference is divided by the minimum current value so that the first detection value is obtained.

The preset number may be 50, 100, 150 or other values. A specific preset number may be set according to specific operating conditions. Only an exemplary description is provided here, and a specific value of the preset number is not specifically limited herein.

In addition, the first detection value may also be obtained by a method described below. Current values of the intelligent electric tool within a second preset time window are sampled, where samples include a current value at a start moment of the second preset time window and a current value at an end moment of the second preset time window. A difference between the current value at the end moment of the second preset time window and the current value at the start moment of the second preset time window is calculated according to the current value at the start moment of the second preset time window and the current value at the end moment of the second preset time window. In addition, the second preset time window may be a fixed time interval such as 30 milliseconds, 100 milliseconds, or 160 milliseconds or may also be multiple different fixed time intervals. It is to be noted that a specific value and a setting type of the second preset time window may be set according to specific operating conditions. Only an exemplary description is provided here, and the specific value of the second preset time window is not specifically limited herein.

Figure 4:
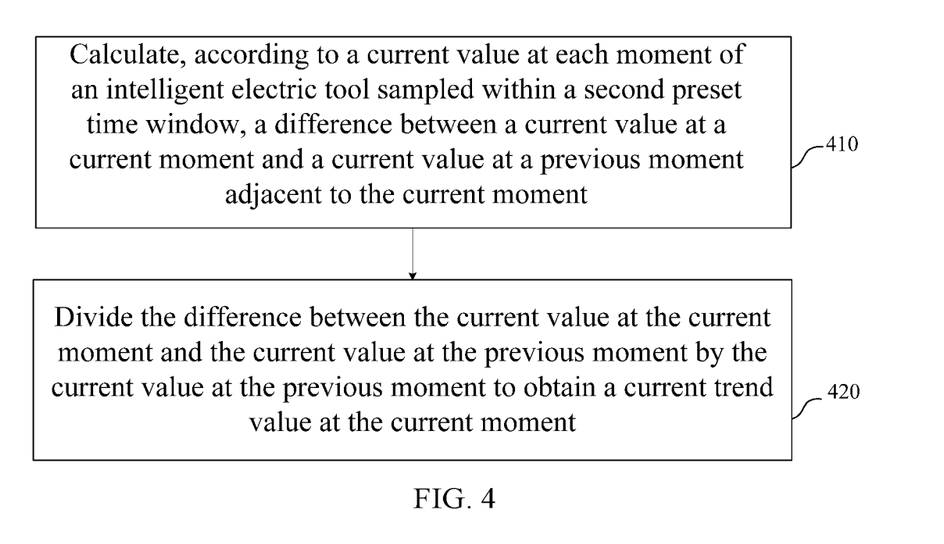
FIG. 4 is a flowchart of a method for calculating a second detection value of an intelligent electric tool according to an example of the present disclosure.

FIG. 4 is a flowchart of a method for calculating a second detection value of an intelligent electric tool according to an example of the present disclosure. On the basis of the preceding technical solutions, the method for calculating the second detection value provided by the example of the present disclosure includes steps described below.

In step 410, a difference between a current value at a current moment and a current value at a previous moment adjacent to the current moment is calculated according to a current value at each moment of the intelligent electric tool sampled within a second preset time window.

The third preset time window may be a fixed time interval such as 50 milliseconds, 100 milliseconds, or 150 milliseconds or may also be multiple different fixed time intervals. It is to be noted that a specific value and a setting type of the third preset time window may be set according to specific operating conditions. Only an exemplary description is provided here, and the specific value of the third preset time window is not specifically limited herein.

In step 420, the difference between the current value at the current moment and the current value at the previous moment is divided by the current value at the previous moment so that a second detection value at the current moment is obtained.

Specifically, in response to the second detection value at the current moment being less than zero, a second detection value at the previous moment is used as the second detection value at the current moment.

Generally, in order to facilitate the speed regulation by an operator, the intelligent electric tool has multiple gears for speed regulation, such as a metal gear. A pressing angle of a trigger for the metal gear is adjusted so that a duty cycle of speed regulation of the motor can be adjusted, and then an operation speed of the intelligent electric tool can be adjusted. An inventor has found through researches that when the pressing angle of the trigger for the metal gear of the intelligent electric tool is within a range of 0 to 10%, the corresponding duty cycle is 0 to 30% and increases according to a certain proportion, but the intelligent electric tool does not trigger an automatic stop function. When the pressing angle of the trigger is within a range of 10% to 100%, the corresponding duty cycle increases and can be stabilized at 100%. Therefore, when the pressing angle of the trigger is within the range of 10% to 100%, the automatic stop function of the intelligent electric tool can be activated.

Optionally, before the intelligent electric tool triggers a stop, the method further includes a step described below. If the first detection value continuously decreases more than twice and a first detection value after a second decrease is less than or equal to a first preset value within a first preset time and a first detection value at a subsequent sampling moment is less than or equal to zero, it indicates that the intelligent electric tool is started successfully.

The first preset time may be 11 milliseconds, 10 milliseconds, 9 milliseconds or the like, and the first preset value may be −3. Specific values of the first preset time and the first preset value may be set according to specific operating conditions and are not specifically limited herein.

Optionally, the step of controlling, according to the first detection value and/or the second detection value, the motor to stop rotating to control the intelligent electric tool to stop may specifically include multiple different operating conditions described below.

Operating condition one: after a peak value of the first detection value appears, if the first detection value is greater than or equal to a second preset value after M sampling periods of the first detection value and the first detection value continuously decreases twice after the case where the first detection value is greater than or equal to the second preset value, the intelligent electric tool triggers the stop.

M is a sampling period of the first detection value and may be a positive integer such as 11, 10, or 9. The value M may be set according to specific operating conditions and a requirement on a sampling frequency, and a specific value is not specifically limited herein. The second preset value may be −2, and a specific value may be set according to specific operating conditions and is not specifically limited herein.

Operating condition two: after the peak value of the first detection value appears, if the first detection value is less than or equal to a third preset value after the M sampling periods of the first detection value, the intelligent electric tool triggers a stop.

M is the sampling period of the first detection value and may be a positive integer such as 11, 10, or 9. The value M may be set according to specific operating conditions and a requirement on a sampling frequency, and a specific value is not specifically limited herein. The third preset value is less than the second preset value. The third preset value may be −4, and a specific value may be set according to specific operating conditions and is not specifically limited herein.

Operating condition three: after the peak value of the first detection value and a steep peak value of the first detection value appear, if the first detection value is greater than or equal to a fourth preset value, the intelligent electric tool triggers a stop. The fourth preset value may be 11, and a specific value may be set according to specific operating conditions and is not specifically limited herein. Operating condition four: after the peak value of the first detection value and the steep peak value of the first detection value appear, if the first detection value is less than or equal to a fifth preset value, the first detection value continuously increases three times after the case where the first detection value is less than or equal to the fifth preset value, and a first detection value after a last increase is greater than or equal to zero, the intelligent electric tool triggers a stop, where the fifth preset value is less than the fourth preset value. The fifth preset value may be −5, and a specific value may be set according to specific operating conditions and is not specifically limited herein.

Operating condition five: in the case where the peak value of the first detection value appears and the steep peak value of the first detection value does not appear, if the first detection value is greater than or equal to the fourth preset value and the first detection value is greater than or equal to a sixth preset value after the case where the first detection value is greater than or equal to the fourth preset value, the intelligent electric tool triggers a stop. The sixth preset value is greater than the fourth preset value. The sixth preset value may be 18, and a specific value may be set according to specific operating conditions and is not specifically limited herein.

Operating condition six: after the peak value of the first detection value and the steep peak value of the first detection value appear, if the second detection value is greater than or equal to a seventh preset value and the first detection value is greater than or equal to an eighth preset value within N sampling periods of the first detection value after the case where the second detection value is greater than or equal to the seventh preset value, the intelligent electric tool triggers a stop; and if the first detection value is not greater than or equal to the eighth preset value, all timers are set to zero and started again for another detection.

N is the sampling period of the first detection value and may be a positive integer such as 5, 6, or 7. The value N may be set according to specific operating conditions and a requirement on the sampling frequency. The eighth preset value is less than the seventh preset value. The seventh preset value may be 28, the eighth preset value may be 9, and specific values of the seventh preset value and the eighth preset value may be set according to specific operating conditions and are not specifically limited herein.

Operating condition seven: in the case where the peak value of the first detection value appears and the steep peak value of the first detection value does not appear, if the second detection value has a maximum value greater than or equal to a ninth preset value and a minimum value greater than or equal to a tenth preset value within two consecutive sampling periods of the second detection value and the first detection value is greater than or equal to the eighth preset value within N sampling periods of the first detection value after the case where the second detection value has the maximum value greater than or equal to the ninth preset value within the two consecutive sampling periods of the second detection value, the intelligent electric tool triggers a stop; and if the first detection value is not greater than or equal to the eighth preset value, all timers are set to zero and started again for another detection.

N is the sampling period of the first detection value and may be a positive integer such as 5, 6, or 7. The value N may be set according to specific operating conditions and the requirement on the sampling frequency. The tenth preset value is less than the ninth preset value. The ninth preset value may be 26, the tenth preset value may be 20, and specific values of the ninth preset value and the tenth preset value may be set according to specific operating conditions and are not specifically limited herein.

Operating condition eight: after the peak value of the first detection value appears, if the second detection value is greater than or equal to an eleventh preset value, the intelligent electric tool triggers a stop. The eleventh preset value may be 40, and a specific value may be set according to specific operating conditions and is not specifically limited herein.

Operating condition nine: in the case where the peak value of the first detection value does not appear and the second detection value is greater than or equal to the eleventh preset value, if the first detection value is greater than or equal to the eighth preset value within N sampling periods of the first detection value after the case where the peak value of the first detection value does not appear and the second detection value is greater than or equal to the eleventh preset value, the intelligent electric tool triggers a stop; and if the first detection value is not greater than or equal to the eighth preset value, all timers are set to zero and started again for another detection.

N is the sampling period of the first detection value and may be a positive integer such as 5, 6, or 7. The value N may be set according to specific operating conditions and the requirement on the sampling frequency, and a specific value is not specifically limited herein.

Operating condition ten: in the case where the peak value of the first detection value does not appear and the second detection value has a maximum value greater than or equal to a twelfth preset value and a minimum value greater than or equal to the tenth preset value within two consecutive sampling periods of the second detection value, if the first detection value is greater than or equal to the eighth preset value within N sampling periods of the first detection value after the case where the peak value of the first detection value does not appear and the second detection value has the maximum value greater than or equal to the twelfth preset value and the minimum value greater than or equal to the tenth preset value within the two consecutive sampling periods of the second detection value, the intelligent electric tool triggers a stop; and if the first detection value is not greater than or equal to the eighth preset value, all timers are set to zero and started again for another detection.

N is the sampling period of the first detection value and may be a positive integer such as 5, 6, or 7. The value N may be set according to specific operating conditions and the requirement on the sampling frequency. The tenth preset value is less than the twelfth preset value. The twelfth preset value may be 30, and a specific value of the twelfth preset value may be set according to specific operating conditions and is not specifically limited herein.

It is to be noted that determination conditions for the triggered stop under the preceding ten conditions are independent of each other, and as long as the first detection value and/or the second detection value satisfy any of the preceding ten operating conditions, the intelligent electric tool may trigger a stop.

On the basis of the preceding technical solutions, a method for determining whether the peak value of the first detection value appears includes a step described below.

If the first detection value is greater than or equal to a fifteenth preset value within a second preset time after the intelligent electric tool is successfully started, the first detection value continuously decreases twice after the case where the first detection value is greater than or equal to the fifteenth preset value, and a first detection value after a second decrease is greater than or equal to zero, it may be determined that the peak value of the first detection value appears.

The fifteenth preset value is greater than zero. The second preset time may be 1 millisecond, 1.2 milliseconds or the like. The fifteenth preset value may be 3. Specific values of the second preset time and the fifteenth preset value may be set according to specific operating conditions and are not specifically limited herein.

On the basis of the preceding technical solutions, a method for determining whether the steep peak value of the first detection value appears includes a step described below.

After it is determined that the peak value of the first detection value appears, if the first detection value is greater than or equal to a thirteenth preset value and the first detection value is less than or equal to a fourteenth preset value after the case where the first detection value is greater than or equal to the thirteenth preset value, it may be determined that the steep peak value of the first detection value appears. The fourteenth preset value is less than the thirteenth preset value. The thirteenth preset value may be 6, the fourteenth preset value may be −1, and specific values of the thirteenth preset value and the fourteenth preset value may be set according to specific operating conditions and are not specifically limited herein.

Figure 5:
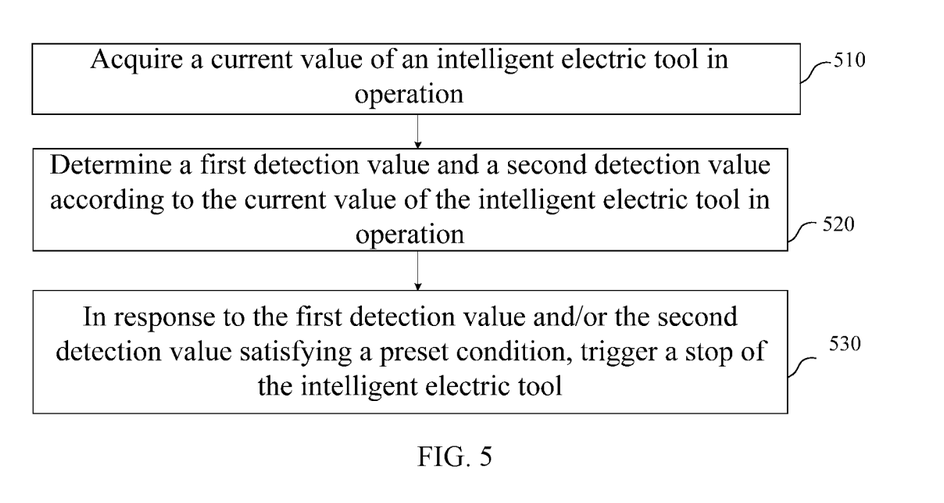
FIG. 5 is a flowchart of a method for controlling an intelligent electric tool according to an example of the present disclosure.

FIG. 5 is a flowchart of a method for controlling an intelligent electric tool according to an example of the present disclosure. Referring to FIG. 5, this example may be applied to an implementation process of the method for controlling the intelligent electric tool, and the method may be performed by the intelligent electric tool. Specifically, the method may be performed by software and/or hardware in the intelligent electric tool. The method specifically includes steps described below.

In step 510, a current value of the intelligent electric tool in operation is acquired.

The intelligent electric tool includes a motor, a controller, a detection unit and the like. Specifically, the current value of the intelligent electric tool in operation may be acquired by the detection unit such as a current sampling circuit. The detection unit is electrically connected to the motor and the controller separately and may be the current sampling circuit. The current sampling circuit may include a current detection resistor, and a current through the current detection resistor is collected so that a current value output by the intelligent electric tool can be acquired. A current value output by the motor is collected in real time by the current sampling circuit, and the current value collected in real time is fed back to the controller in real time. The current collected by the current sampling circuit may include a current of the intelligent electric tool at any moment in a startup process or an operation process or before a stop.

In step 520, a first detection value and a second detection value are determined according to the current value of the intelligent electric tool in operation.

For example, the controller in the intelligent electric tool acquires the current value of the intelligent electric tool in operation in real time through the current sampling circuit and can calculate the first detection value and the second detection value at a corresponding moment according to a change value of the current acquired in real time. The first detection value may be a current change rate capable of reflecting a change rate of the current value of the intelligent electric tool with respect to time. The second detection value may be a current trend value capable of reflecting a change trend of the current value of the intelligent electric tool.

In step 530, in response to the first detection value and/or the second detection value satisfying a preset condition, the intelligent electric tool triggers a stop.

Specifically, the preset condition may be set according to different operating conditions of the intelligent electric tool. For example, it may be set that the intelligent electric tool triggers a stop simply when the first detection value satisfies a first preset threshold of the first detection value; it may be set that the intelligent electric tool triggers a stop simply when the second detection value satisfies a first preset threshold of the second detection value; it may be set that the intelligent electric tool triggers a stop when both the first detection value and the second detection value satisfy their respective preset thresholds; it may be set that the intelligent electric tool triggers a stop when the first detection value satisfies a preset threshold and the second detection value does not satisfy a preset threshold; and it may be set that the intelligent electric tool triggers a stop when the second detection value satisfies the preset threshold and the first detection value does not satisfy the preset threshold. It is to be noted that which preset condition the first detection value and/or the second detection value specifically satisfy may be set according to the specific operating conditions. Only an exemplary description is provided here, and which conditions are specifically included is not specifically limited herein.

In the technical solution of this example, a principle of the method for controlling the intelligent electric tool is described below. In the operation process of the intelligent electric tool, the current value output by the intelligent electric tool is detected and acquired in real time. The first detection value and the second detection value of the current at the corresponding moment are calculated in real time according to the current value acquired in real time. The calculated first detection value and second detection value at the corresponding moment are compared with the preset condition preset in software. If the first detection value and/or the second detection value satisfy the preset condition, the intelligent electric tool triggers a stop. It can be seen that, whether to trigger the stop of the intelligent electric tool may be determined by determining whether the first detection value and/or the second detection value satisfy the preset condition. Various combinations of determination conditions of the first detection value and/or the second detection value can satisfy the requirement for determining the triggered stop of the intelligent electric tool under various different operating conditions, improving the efficiency of automatic control of the intelligent electric tool.

In the technical solution provided by the example of the present disclosure, the current value of the intelligent electric tool in operation is acquired, the first detection value and the second detection value are determined according to the current value of the intelligent electric tool in operation, and in response to the first detection value and/or the second detection value satisfying the preset condition, the intelligent electric tool triggers the stop. In this manner, the problem of a failure to implement an automatic stop under various operating conditions and low operating efficiency in the related art is solved, and the intelligent electric tool can trigger the stop when the first detection value and/or the second detection value satisfy the preset condition, which can adapt to various different operating conditions and improve the operating efficiency.

It is to be noted that the above are merely preferred examples of the present disclosure and the technical principles used therein. It is to be understood by those skilled in the art that the present disclosure is not limited to the examples described herein. Those skilled in the art can make various apparent modifications, adaptations and substitutions without departing from the scope of the present disclosure. Therefore, while the present disclosure has been described in detail through the preceding examples, the present disclosure is not limited to the preceding examples and may further include more other equivalent examples without departing from the concept of the present disclosure. The scope of the present disclosure is determined by the scope of the appended claims.

What is claimed is:

1. An intelligent electric tool for driving a fastener into a workpiece, comprising:
    an output shaft configured to output torsion;
    a motor configured to drive the output shaft to rotate;
    a housing for accommodating the motor;
    a transmission assembly configured to connect the motor to the output shaft;
    an adjustment assembly configured to adjust an operating mode of the intelligent electric tool, wherein the operating mode comprises at least a metal mode;
    a detection unit configured to detect a current value of the intelligent electric tool in operation; and
    a controller, wherein the controller is configured to:
        determine a first detection value and a second detection value according to the current value of the intelligent electric tool in operation; and
        in response to the first detection value and/or the second detection value satisfying a preset condition, control the motor to stop rotating to control the intelligent electric tool to stop, and
        the first detection value comprises a current change rate, and the second detection value comprises a current trend value.

2. The intelligent electric tool of claim 1, wherein determining the first detection value according to the current value of the intelligent electric tool in operation comprises:
    calculating, according to a maximum current value and a minimum current value of current values of the intelligent electric tool sampled within a first preset time window, a difference between the maximum current value and the minimum current value, multiplying the difference between the maximum current value and the minimum current value by a preset number to obtain a multiple of the difference, and dividing the multiple of the difference by the minimum current value to obtain the first detection value; or
    calculating, according to a current value at an end moment of a second preset time window and a current value at a start moment of the second preset time window sampled within the second preset time window, a difference between the current value at the end moment of the second preset time window and the current value at the start moment of the second preset time window to obtain the first detection value.

3. The intelligent electric tool of claim 1, wherein determining the second detection value according to the current value of the intelligent electric tool in operation comprises:
    calculating, according to a current value at each moment of the intelligent electric tool sampled within a first preset time window, a difference between a current value at a current moment and a current value at a previous moment adjacent to the current moment, and dividing the difference between the current value at the current moment and the current value at the previous moment by the current value at the previous moment to obtain a second detection value at the current moment; and
    in response to the second detection value at the current moment being less than zero, using a second detection value at the previous moment as the second detection value at the current moment.

4. The intelligent electric tool of claim 1, wherein, if the first detection value continuously decreases more than twice and a first detection value after a second decrease is less than or equal to a first preset value within a first preset time and a first detection value at a subsequent sampling moment is less than or equal to zero, the intelligent electric tool is started successfully.

5. The intelligent electric tool of claim 1, wherein in response to the first detection value and/or the second detection value satisfying the preset condition, controlling the motor to stop rotating to control the intelligent electric tool to stop comprises:
    after a peak value of the first detection value appears and in response to the first detection value being greater than or equal to a first preset value after M sampling periods of the first detection value and the first detection value continuously decreasing twice after a case where the first detection value is greater than or equal to the first preset value, triggering a stop of the intelligent electric tool; or
    in response to the first detection value being less than or equal to a second preset value after M sampling periods of the first detection value, triggering a stop of the intelligent electric tool;

wherein M is a positive integer, and the second preset value is less than the first preset value.

6. The intelligent electric tool of claim 5, wherein appearance of the peak value of the first detection value comprises:
in response to the first detection value being greater than or equal to a third preset value within a fourth preset time after the intelligent electric tool is successfully started, the first detection value continuously decreasing twice after a case where the first detection value is greater than or equal to a fourth preset value, and a first detection value after a second decrease being greater than or equal to zero, determining that the peak value of the first detection value appears, wherein the third preset value is greater than zero.

7. The intelligent electric tool of claim 1, wherein controlling, according to the first detection value and/or the second detection value, the motor to stop rotating to control the intelligent electric tool to stop further comprises:
after a peak value of the first detection value and a steep peak value of the first detection value appear, in response to the first detection value being greater than or equal to a first preset value, triggering a stop of the intelligent electric tool.

8. The intelligent electric tool of claim 7, wherein appearance of the steep peak value of the first detection value comprises:
after the peak value of the first detection value appears and in response to the first detection value being greater than or equal to a second preset value and the first detection value being less than or equal to a third preset value after a case where the first detection value is greater than or equal to the second preset value, determining that the steep peak value of the first detection value appears, wherein the third preset value is less than the second preset value.

9. The intelligent electric tool of claim 1, wherein controlling, according to the first detection value and/or the second detection value, the motor to stop rotating to control the intelligent electric tool to stop further comprises:
after a peak value of the first detection value and a steep peak value of the first detection value appear, in response to the first detection value being less than or equal to a first preset value, the first detection value continuously increasing three times after a case where the first detection value is less than or equal to the first preset value, and a first detection value after a last increase being greater than or equal to zero, triggering a stop of the intelligent electric tool; or
in a case where a peak value of the first detection value appears and a steep peak value of the first detection value does not appear, in response to the first detection value being greater than or equal to a second preset value and the first detection value being greater than or equal to a third preset value after a case where the first detection value is greater than or equal to the second preset value, triggering a stop of the intelligent electric tool; wherein the third preset value is greater than the second preset value, and the second preset value is greater than the first preset value; or
after a peak value of the first detection value and a steep peak value of the first detection value appear, in response to the second detection value being greater than or equal to a fourth preset value and the first detection value being greater than or equal to a fifth preset value within N sampling periods of the first detection value after a case where the second detection value is greater than or equal to the fourth preset value, triggering a stop of the intelligent electric tool, wherein the fifth preset value is less than the fourth preset value; and in response to the first detection value being not greater than or equal to the fifth preset value, performing another detection; or
in a case where a peak value of the first detection value appears and a steep peak value of the first detection value does not appear, in response to the second detection value having a maximum value greater than or equal to a sixth preset value and a minimum value greater than or equal to a seventh preset value within two consecutive sampling periods of the second detection value and the first detection value being greater than or equal to an eighth preset value within N sampling periods of the first detection value after a case where the second detection value has the maximum value greater than or equal to the sixth preset value within the two consecutive sampling periods of the second detection value, triggering a stop of the intelligent electric tool; and in response to the first detection value being not greater than or equal to the eighth preset value, performing another detection; wherein the seventh preset value is less than the sixth preset value, and N is a positive integer.

10. The intelligent electric tool of claim 1, wherein controlling, according to the first detection value and/or the second detection value, the motor to stop rotating to control the intelligent electric tool to stop further comprises:
after a peak value of the first detection value appears and in response to the second detection value being greater than or equal to a first preset value, triggering a stop of the intelligent electric tool; or
in a case where a peak value of the first detection value does not appear and the second detection value is greater than or equal to the first preset value, in response to the first detection value being greater than or equal to a second preset value within N sampling periods of the first detection value after the case where the peak value of the first detection value does not appear and the second detection value is greater than or equal to the first preset value, triggering a stop of the intelligent electric tool; and in response to the first detection value being not greater than or equal to the second preset value, performing another detection; or
in a case where a peak value of the first detection value does not appear and the second detection value has a maximum value greater than or equal to a third preset value and a minimum value greater than or equal to a fourth preset value within two consecutive sampling periods of the second detection value, in response to the first detection value being greater than or equal to the second preset value within N sampling periods of the first detection value after the case where the peak value of the first detection value does not appear and the second detection value has the maximum value greater than or equal to the third preset value and the minimum value greater than or equal to the fourth preset value within the two consecutive sampling periods of the second detection value, triggering a stop of the intelligent electric tool; and in response to the first detection value being not greater than or equal to the second preset value, performing another detection; wherein the fourth preset value is less than the first preset value, and N is a positive integer.

* * * * *